(12) United States Patent
Segawa

(10) Patent No.: US 8,276,817 B2
(45) Date of Patent: Oct. 2, 2012

(54) INFORMATION MEDIA PROCESSING DEVICE

(75) Inventor: Takeshi Segawa, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 12/479,110

(22) Filed: Jun. 5, 2009

(65) Prior Publication Data

US 2009/0302112 A1    Dec. 10, 2009

(30) Foreign Application Priority Data

Jun. 5, 2008  (JP) ................................ 2008-148397

(51) Int. Cl.
G06K 7/08  (2006.01)
(52) U.S. Cl. ...................................................... 235/449
(58) Field of Classification Search .................. 235/375, 235/379, 380, 435, 439, 449, 487, 493
See application file for complete search history.

(56) References Cited

U.S. PATENT DOCUMENTS

| | | | | |
|---|---|---|---|---|
| 6,983,885 B2 * | 1/2006 | Endo et al. | .................... | 235/449 |
| 2004/0217170 A1 * | 11/2004 | Takiguchi et al. | ............ | 235/449 |
| 2005/0145689 A1 * | 7/2005 | Osawa et al. | ................. | 235/379 |
| 2006/0102723 A1 * | 5/2006 | Delaney et al. | ............... | 235/454 |
| 2007/0164097 A1 * | 7/2007 | Kwak et al. | .................... | 235/379 |
| 2008/0225075 A1 * | 9/2008 | Nishizaka | ....................... | 347/19 |

FOREIGN PATENT DOCUMENTS

| | | |
|---|---|---|
| JP | 2004-110612 A | 4/2004 |
| JP | 2006-40256 A | 2/2006 |

* cited by examiner

Primary Examiner — Michael G Lee
Assistant Examiner — Matthew Mikels
(74) Attorney, Agent, or Firm — Cantor Colburn LLP

(57) ABSTRACT

An information media processing device may include a transport passage in which an information medium having MICR characters printed in a predetermined print position is transported, a magnetic head arranged in the transport passage, an image reading means arranged in the transport passage, a transporting means arranged in the transport passage, which has a shifting mechanism for shifting the information medium into an area in which the magnetic head can make magnetic detection, and a controller which detects the reference edge of the information medium based on the image read by the image reading means to judge if the print position is distanced by a predetermined amount or more from the magnetically-detectable area of the magnetic head based on the reference edge; when the print position is distanced by a predetermined amount or more, the transporting means shifts the information medium into the magnetically-detectable area while transporting the information medium.

4 Claims, 14 Drawing Sheets

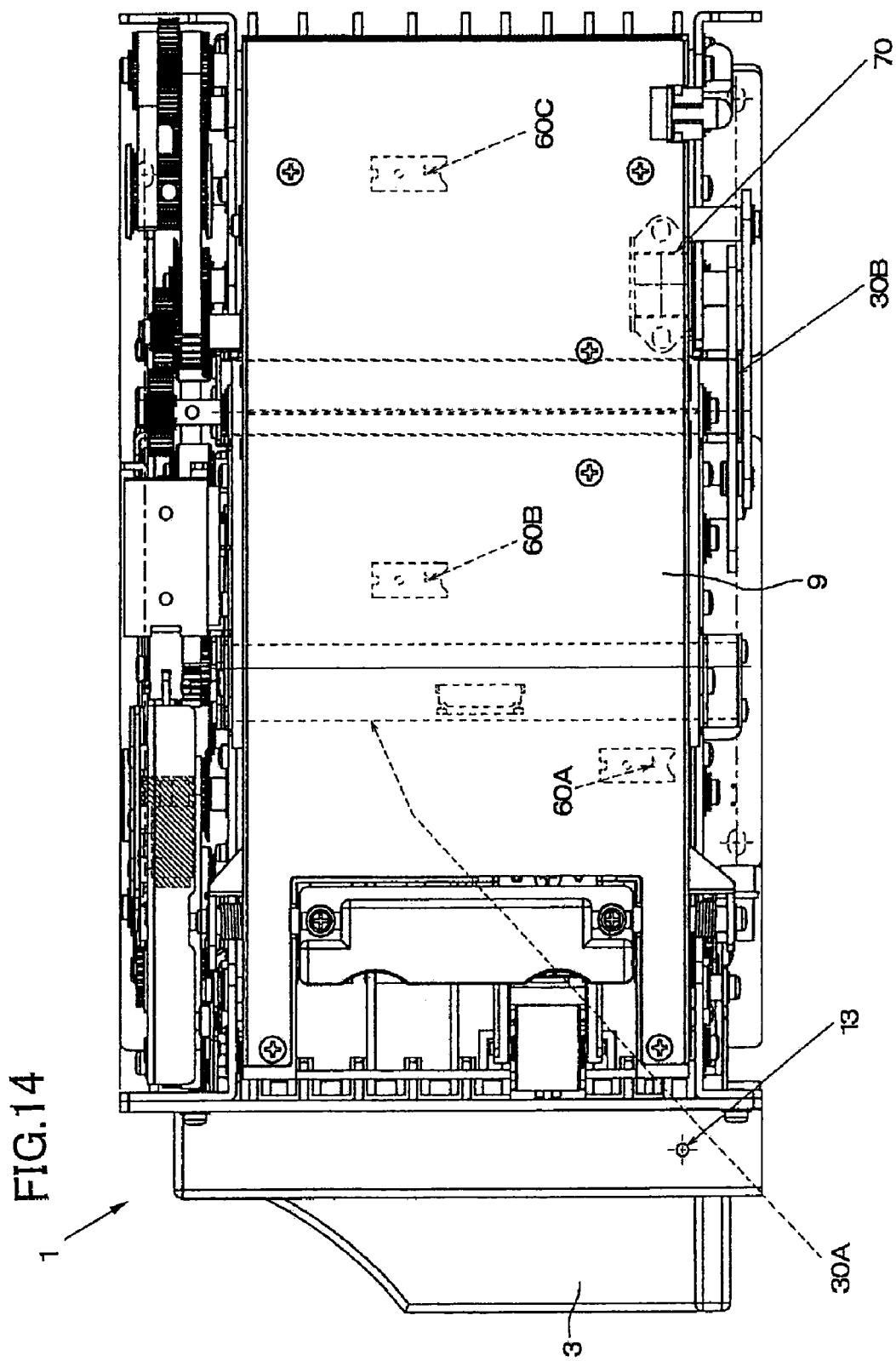

INFORMATION MEDIA PROCESSING DEVICE

CROSS REFERENCE TO RELATED APPLICATION

The present application claims priority under 35 U.S.C. §119 to Japanese Application No. 2008-148397 filed Jun. 5, 2008, the contents of which are incorporated herein by reference.

TECHNICAL FIELD

The present invention relates to an information media processing device. More specifically described, at least an embodiment of the present invention relates to an information media processing device that handles information media in which the print position of MICR (Magnetic Ink Character Recognition) characters is determined based on the reference edge of the information medium and that has a magnetic head for magnetically reading the MICR characters.

TECHNICAL BACKGROUND

An image reading device disclosed in Japanese Patent Application 2004-110612 Unexamined Publication is an example of the information media processing device that reads MICR (Magnetic Ink Character Recognition) characters printed on information media, such as checks, with a magnetic head and performs predetermined processes. In this image reading device, the original script is first read by an image-reading unit and the imaging process is performed on the image data to detect the line of the MICR characters; then, a magnetic head is moved to the position opposing the character line to prevent the off-track condition (in which the magnetic head is off-track from the MICR characters) when the MICR characters are magnetically read.

Also, in an magnetic ink character reading device disclosed in Japanese Patent Application 2006-40256 Unexamined Publication, the character line obtained by optically reading and decoding the magnetic ink characters is collated with the character line obtained by magnetically reading and decoding the characters to improve accuracy in decoding the magnetic ink characters. In the optical reading of the magnetic ink characters, an imaging process is performed on the read image data to extract the magnetic ink characters and then a matching process is performed for matching or comparing the data with a template to determine the best match.

[Patent Reference 1] Japanese Laid-open Patent Application 2004-110612

[Patent Reference 2] Japanese Laid-open Patent Application 2006-40256

SUMMARY

However, in the above-described image reading device, when the image data is read, the MICR characters are magnetically read. In order to prevent [the medium from being off-track when magnetically reading the MICR characters, the imaging process is performed based on the image data to detect the position of the MICR character line. Because of this, the process requires a longer time.

Also, in the above-described magnetic ink character reading device, the magnetic ink characters are optically read for decoding; therefore, high level computation is needed, requiring longer process time.

Thus, at least an embodiment of the present invention may provide an information media processing device which is capable of fast processing.

For example, an embodiment may comprise an information media processing device that comprises a transport passage in which an information medium having MICR characters printed in a predetermined position thereon is transported, a magnetic head arranged in the transport passage for detecting magnetism of the MICR characters, an image reading means arranged in the transport passage for reading the image of the information medium, a transporting means arranged in the transport passage and having a shifting mechanism which shifts the information medium into the area in which the magnetic head can detect magnetism of the information medium, and a controller which detects the reference edge of the information medium based on the image read by the image reading means and judges based on the reference edge if the print position is distanced by a predetermined amount or more from the area in which the magnetic head can detect magnetism; when the print position is distanced by a predetermined amount or more, the transporting means shifts the information medium into the area in which the magnetism can be detected while transporting the information medium.

Therefore, the information medium taken inside the device is transported in the transport passage by the transporting means and the magnetism of the MICR characters is detected by the magnetic head arranged in the transport passage. The transporting means configures the shifting mechanism which moves the information medium into the area in which the magnetic head is able to detect the magnetism of the MICR characters, while transporting the medium. The image reading means reads the image of the information medium being transported; the controller detects the reference edge of the information medium from the read image to judge if the print position of the MICR characters is in the area in which the magnetic head is able to detect magnetism of the characters; when the print position of the MICR characters is separated from magnetism-detectable area of the magnetic head by a predetermined distance or more, the transporting means performs the transporting operation again to shift the information media into the area in which the magnetic head is able to detect magnetism of the MICR characters.

Additionally, the information media processing device may be configured so that the shifting mechanism is configured by rollers which are supported to be freely displaced according to the forward direction or reverse direction in the transporting direction. Therefore, while the information medium is being transported in either the forward direction or the reverse direction, the information medium can be shifted.

Further, the transport passage may comprise a first transport passage used for transporting the information medium from an insertion slot and a second transport passage used for transporting the information medium when the information medium is transported in the reverse direction, and a diverging means is provided for diverging the first transport passage from the second transport passage. Therefore, when the information medium is transported in the forward direction, it passes through the first transport passage; when transported in the reverse direction, the information medium passes through the second transport passage. The diverging means is arranged at the divergent position between the first transport passage and the second transport passage so that the information medium that needs to be transported in the reverse direction is guided to the second transport passage.

Thus, at least an embodiment of the information media processing device judges, based on the reference edge of the information medium detected from the image, if the print position is distanced by a predetermined amount or more from the area in which the magnetic head is able to detect magnetism—of the characters, i.e., if the print position—is off-track; therefore, unlike the prior art in which the off-track condition is detected based on the print position of the MICR characters on the information medium detected from the image, this imaging process enables quick and easy off-track judgment. Also, the information medium can be shifted while being transported; therefore, no additional component such as a shifting plate is needed, preventing an enlarged, expensive device.

Thus, in at least an embodiment, in the information media processing device when the information medium is transported in either the forward direction or the reverse direction, the information medium can be shifted, thus shortening the processing time.

Further, in at least an embodiment, in the information media processing device, the information media will not be transported in the reverse direction in the first transport passage which is connected to the insertion slot; therefore, the information medium is prevented from mistakenly being pulled out from the insertion slot by a user during the time of shifting.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

[FIG. 14] A plan view of another embodiment of the information media processing device of the present invention.

DETAILED DESCRIPTION OF THE INVENTION

Figure 1:
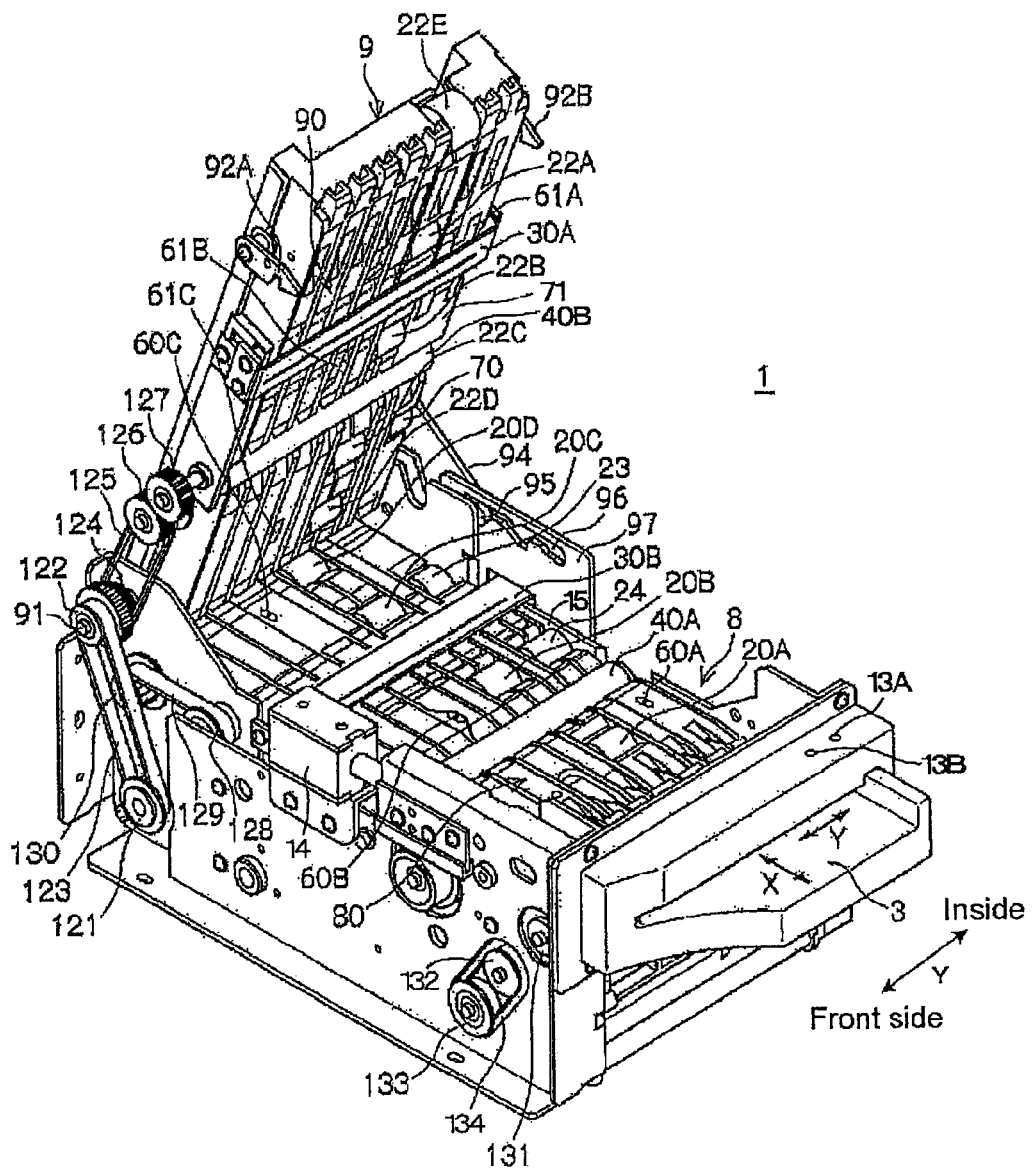
[FIG. 1] A perspective view of an example of an embodiment of an information media processing device of the present invention, showing the status in which a top transport block constituting a transport passage is in an open position.

The configuration of the present invention is described in detail hereinafter, based on the most suitable embodiment.

FIG. 1 through FIG. 13 show an embodiment of the information media processing device of the present invention. An information media processing device 1 is equipped with a transport passage 10 in which an information medium 2 having MICR characters printed in a predetermined print position 140 thereon is transported, a magnetic head 70 arranged in the transport passage 10 for detecting magnetism of the MICR characters, an image reading means 30 arranged in the transport passage 10 for reading the image of the information medium 2, a transporting means 142 arranged in the transport passage and configuring a shifting mechanism 141 for moving the information medium 2 into the area in which the magnetic head 70 is able to detect magnetism of the characters, and a controller 143 which detects the reference edge 2c of the information medium 2 based on the image read by the image reading means 30 to judge based on the reference edge 2c if the print position 140 is distanced by a predetermined amount or more from the area in which the magnetic head 70 is able to detect magnetism; when [the print position is] distanced by a predetermined amount—or more, the transporting means 142 shifts the information medium 2 into the magnetism-detectable area while transporting it.

The information medium 2 is a card-like medium such as a personal check, on the front face of which MICR characters are printed. The said personal check is drafted from a deposit account which is opened for the user's common everyday transactions. On the front face of the personal check, MICR (Magnetic Ink Character Recognition) data including a bank code, a customer account number, check serial numbers, etc. is printed; by collating the data, the validity of the personal check is verified. The paper medium such as a personal check is thin (for example, about 0.05~0.20 mm). Since it can be used and kept while folded, the medium sometimes looses physical strength; however, in the information media processing device 1 of this embodiment, an appropriate process can be performed even on such an information medium 2.

Figure 13:
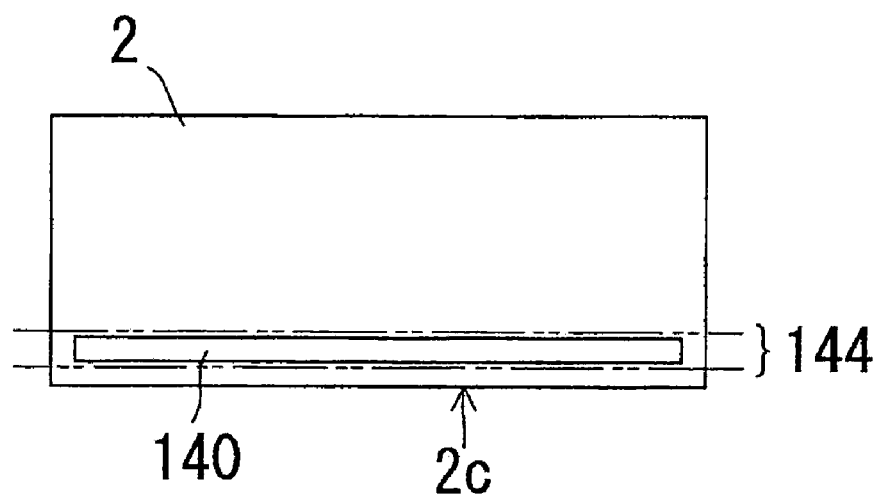
[FIG. 13] A plan view of an information medium.

FIG. 13 illustrates the information medium 2. The MICR characters are printed in the print position 140 distanced by a predetermined amount from the reference edge 2c of the information medium 2. Therefore, the print position 140 of the MICR characters can be detected based on the reference edge 2c. Note that, in FIG. 13, code 144 is given to the trace of the magnetic head 70 sliding in an appropriate positional relationship.

Figure 2:
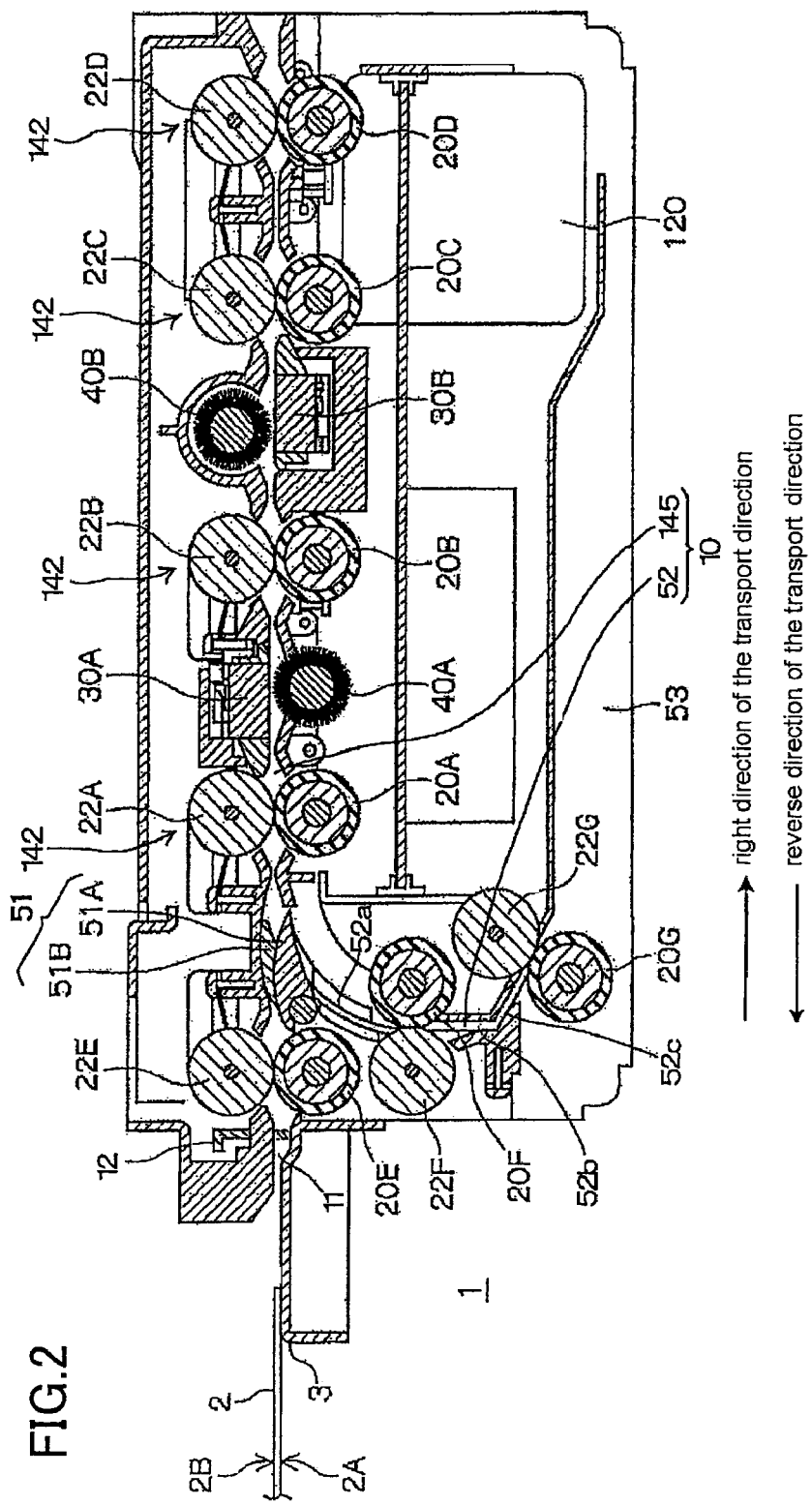
[FIG. 2] A cross-sectional diagram of the information media processing device shown in FIG. 1, showing the operational status in which the top transport block is in a closed position.

FIG. 1 is a perspective view of the information media processing device 1 of this embodiment, showing that a top transport block 9 is in an open position, the transport block 9 constituting the first transport passage 145 of the transport passage 10. FIG. 2 is a cross-sectional diagram of the information media processing device 1, showing the operational status in which the top transport block 9 is in a closed position. Note that the transport passage 10 has a first transport passage 145 used for transporting the information medium 2 from the insertion slot (the media inserting portion 3) and a second transport passage (a retract passage) 52 used for transporting the information medium 2 when the information medium 2 is transported in the reverse direction, and a diverging means 51 is provided for diverging the second transport passage 52 from the first transport passage 145.

The information media processing device 1 of this embodiment guides the information medium 2 inserted at the media inserting portion 3 to the first transport passage 145 and reads the character information written or printed on the information medium 2 with a scanner which is the image reading means 30 arranged in the first transport passage 145 (hereinafter called a scanner 30). After the reading, the information medium 2 is transported to another device (printing device, etc.) arranged further down inside the information media processing device 1 by transport roller 20 and pad roller 22 which are the transporting means 142 of the first transport passage 145 or it is discharged from the media inserting portion 3. In other words, the information media processing device 1 of this embodiment performs a predetermined process on the information media 2. Note that, in this specification, "the front side" is the side close to the media inserting portion 3 of the information media processing device 1 and "the inside" is the rear side of the information media processing device 1 which is opposite from "the front side".

As shown in FIG. 1 and FIG. 2, the information media processing device 1 of this embodiment is equipped with the scanner 30 and a fur brush roller 40 having yarns planted on the surface thereof; the scanner 30 primarily scans in the medium-width direction Y which is orthogonal to the media-transporting direction X in which the information medium 2 is transported and secondarily scans in the media-transporting direction X to read the image data printed on the information medium 2.

Figure 7:
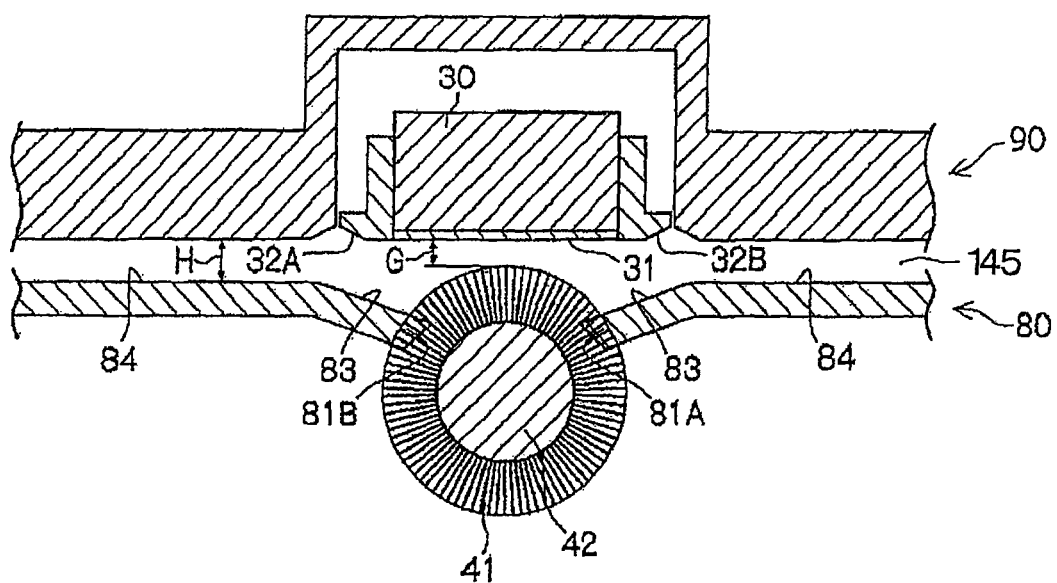
[FIG. 7] A schematic cross-sectional view showing the positional relationship between a scanner shown in FIG. 2 and a fur brush roller.

Also, a gap G is provided between the fur brush roller 40 and the reading surface 31 of the scanner 30 for allowing the information medium 2 to pass [see FIG. 7]. The information media processing device 1 is configured in the following manner: when the transporting means 142 transports the information medium 2 in the transporting direction X in the vicinity of the front side of the first transport passage 145, the fur brush roller 40A regulates the face 2A of the information medium 2 which is the opposite side from the face to be read 2B to guide the information medium 2; when the transporting means 142 transports the information medium 2 in the transporting direction X in the vicinity of the inside of the first transport passage 145, the fur brush roller 40B regulates the face 2A of the information medium 2 which is the opposite side from the face to be read 2B to guide the information medium 2.

Note that, in the description and the figures hereinafter, capital letters accompanying numerical codes are given to identify each of a plurality of the same kind of components that correspond to the numerical codes; the numerical codes only are given to general terms of the components. Each configuration is described hereinafter.

(Configuration of Media Inserting Portion)

Figure 3:
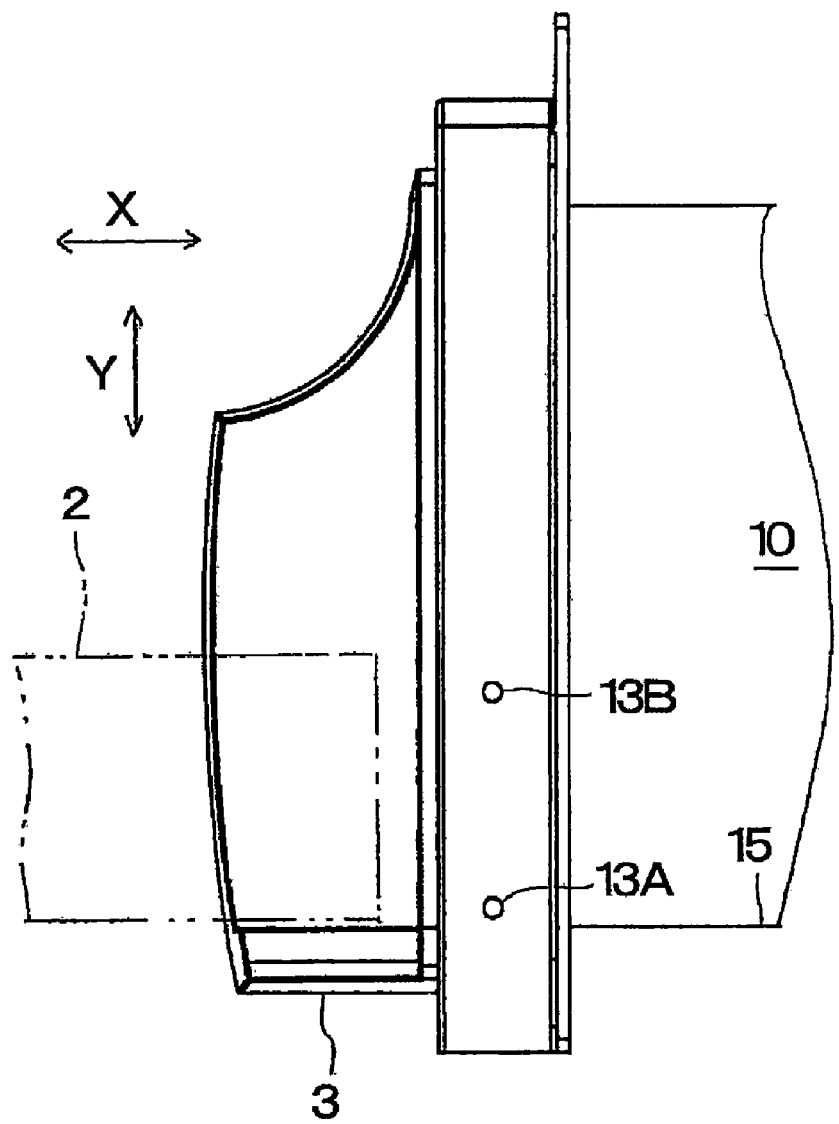
[FIG. 3] A plan view to explain the positioning of insertion-detecting sensors in the media-inserting portion shown in FIG. 1.

FIG. 3 is a plan view to explain the positions of the insertion-detecting sensors 13 inside the media-inserting portion of FIG. 1.

Inside the media-inserting portion 3, as shown in FIG. 2, a media passage 11 is formed for the information medium 2 to pass through. Also, the media-inserting portion 3 is provided with a shutter member 12 which closes and opens the media passage 11 (see FIG. 2) and with two insertion-detecting sensors 13 which detect the insertion of the information medium 2 (see FIG. 3).

The insertion-detecting sensor 13 is an optical sensor composed of a light-emitting device (not illustrated) and a light-receiving device (not illustrated), for example; the light-emitting device and the light-receiving device are opposed to each other, sandwiching the media passage 11 between them.

An insertion-detecting sensor 13A, one of the two insertion-detecting sensors 13, is arranged at one end of the media-inserting portion 3 in the media width direction Y. More specifically described, the insertion-detecting sensor 13A is arranged on the side of a transporting referential surface 15 formed in the first transport passage 145; the transporting referential surface 15 will be described later. In this embodiment, the insertion-detecting sensor 13A is arranged in the vicinity of the forming position for the transporting referential surface 15 in the media width direction Y. Also, the insertion-detecting sensor 13A of this embodiment is an insertion-detecting means arranged on the transporting referential surface 15 side.

An insertion-detecting sensor 13B, the second of the insertion-detecting sensors 13, is distanced by a predetermined amount from the insertion-detecting sensor 13A. More specifically described, the insertion-detecting sensor 13B is distanced by a predetermined amount from the insertion-detecting sensor 13A such that the information medium 2 having a minimum width, with which the medium 2 can be used in the information media processing device 1, can be detected by the two insertion-detecting sensors 13A and 13B.

In this embodiment, when the information media processing device 1 is on stand-by waiting for the information medium 2 to be inserted, the media passage 11 is closed by the shutter member 12. When, under this condition, the insertion-detecting sensor 13B detects the information medium 2, the shutter member 12 opens the media passage 11. Under the same condition, when the detecting sensor 13A detects the information medium 2, transport rollers 20 configuring the transporting means, which will be described later, start rotating to take the information medium 2 into the information media processing device 1. In other words, in this embodiment, unless both of the two insertion-detecting sensors 13A and 13B detect the information medium 2, the information medium 2 cannot be taken into the information media processing device 1. Note that, it can be configured such that the shutter member 12 may open the media passage 11 when the insertion-detecting sensor 13A detects the information medium 2, and the transport rollers 20 of the transporting means, which will be described later, may start rotating when the detecting sensor 13B detects the information medium 2. Also, the shutter member 12 is connected to a solenoid 14 (see FIG. 1) via a predetermined link mechanism (not illustrated) to perform the operation of opening and closing the media passage 11 with the power from the solenoid 14.

(Configuration of First Transport Passage)

Figure 4:
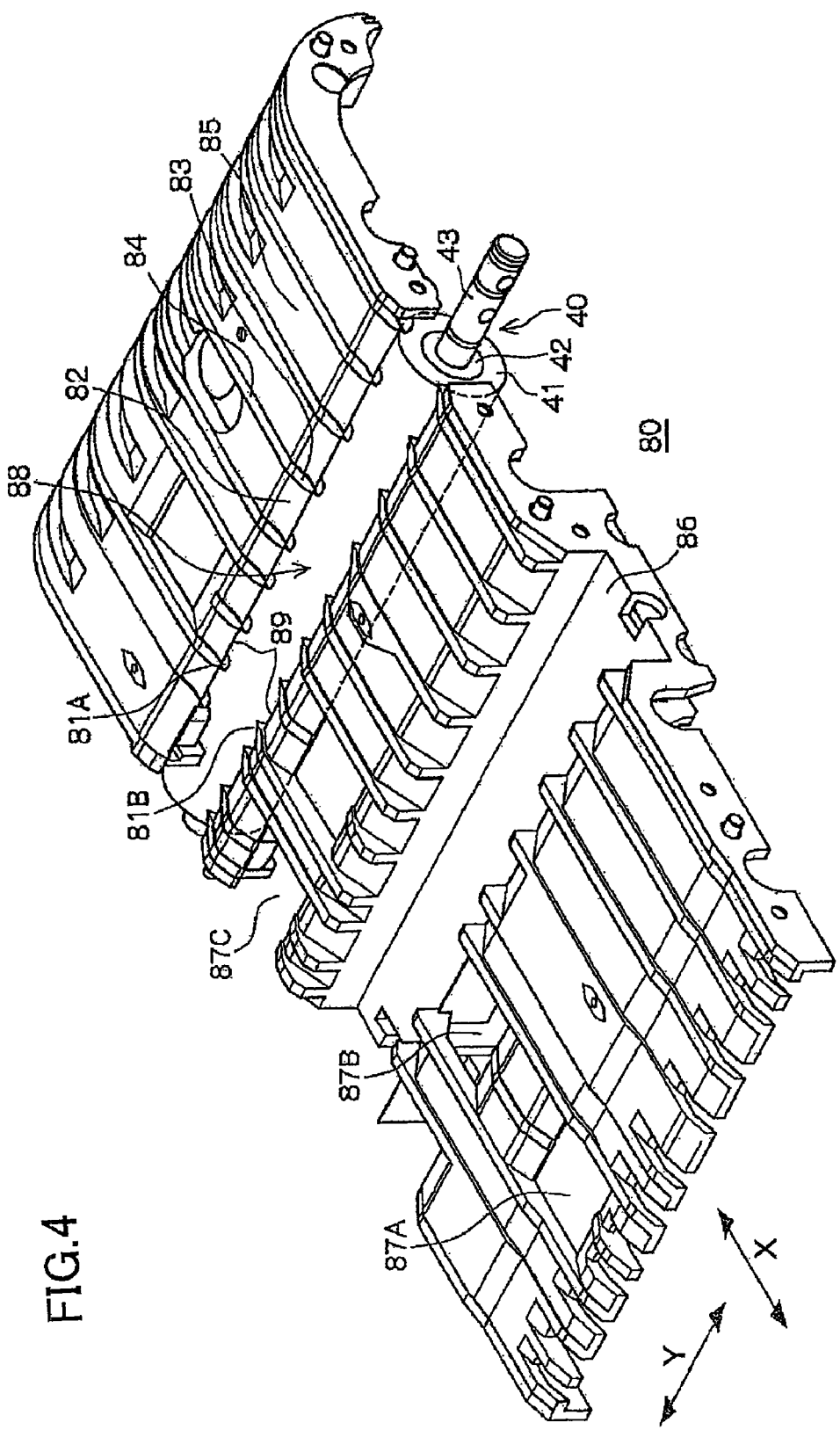
[FIG. 4] A perspective view of a guide member in a bottom transport stage constituting the information media processing device shown in FIG. 1.

FIG. 4 is a perspective view of a guide member 80 of a transport bottom stage 8 which configures the information media processing device 1.

The first transport passage 145 is a run-way for the information medium 2, which, as shown in FIG. 1 and FIG. 2, is configured by a guide member 90 of the top transport block 9 and a guide member 80 of the bottom transport stage 8, which are opposed to each other in the top-bottom direction, and two side plates that configure the side faces of the information media processing device 1. The first transport passage 145 extends straight ahead in the left-right direction of FIG. 2 for the linear transportation of the information medium 2. In other words, the first transport passage 145 is formed linearly so that the information medium 2 can travel straight ahead during the transporting. It is preferred that the first transport passage 145 be extended linearly in the above manner; however, it is not required to be.

Inside the first transport passage 145, the information medium 2 is transported in the media transporting direction X by the transport rollers 20A-20D and pad rollers 22A-22D which are opposed to the transport rollers 20A-20D. Note that, in this embodiment, the transport rollers 20A-20D are arranged in the bottom transport stage 8 and the pad rollers 22A-22D are arranged in the top transport block 9; however, the configuration is not limited to this, but some or all of the transport rollers 20A-20D may be arranged in the top transport block 9 and some or all of the pad rollers 22A-22D may be arranged in the bottom transport stage 8.

At one end of the first transport passage 145 in the media width direction Y, the transporting referential surface 15 is formed as a referential position for the information medium 2. In this embodiment, a portion of the side plate positioned deep inside on the paper surface of FIG. 1 corresponds to the transport referential surface 15. Also, the width of the first transport passage 145 is within the range of 65 mm-110 mm, for example, to accommodate various kinds of information media 2 having different widths. Also, the height H (a gap, see FIG. 7) of the first transport passage 145 may be preferably the size of the gap, 1 mm-3 mm, through which media having winkles due to heavy use can be transported easily.

The guide member 80 of the bottom transport stage 8 configuring the first transport passage 145 is a guide member arranged below the first transport passage 145 and opposed to the guide member 90 of the top transport block 9. The guide member 80 may be preferably a resin mold as shown in FIG. 4; however, it can be something else. Also, a plurality of slit guides 84 that extend in the media transporting direction X (see FIG. 4) are provided in the face of the guide member 80 on the first transport passage 145 side. The slit guides 84 function to assist the information medium 2 to be transported along the media transporting direction X; they are formed as protrusions that protrude by a predetermined height at arbitrary intervals on a flat surface 85.

Also, the guide member 90 of the top transport block 8 that also configures the first transport passage 145 is opposed to the guide member 80 of the bottom transport stage 8; the top transport block 9 can be opened or closed. The guide member 90 may be preferably a resin mold in the same manner as the guide member 80; however, it can be something else. Also, a plurality of slit guides that extend in the media transporting direction X (see FIG. 1) are provided in the face of the guide member 90 on the first transport passage 145 side, in the same manner as the guide member 80.

The top transport block 9 is opened or closed by using a shaft of a pulley 122 used together with a support shaft 91 as a fulcrum; the top transport block 9 is in an open position when it is opened (see FIG. 1) and in a closed position when it is closed (see FIG. 2). The information media processing device 1 is provided with a holding means (94-96) which holds the top transport block 9 in the open position and a lock means (92) which holds the top transport block 9 in the closed position.

The holding means (94-96) are not specified; however, FIG. 1 shows a supporting fulcrum 94 equipped with an engaging pin 95 at the front end thereof and a plate 97 having an engaging portion 96 with which the engaging pin engages at multiple positions. In other words, the top transport block 9 is held in a predetermined open position when the engaging pin 95 at the front end of the supporting fulcrum 94 is engaged with a predetermined engaging portion 96. In order to change the position of the top transport block from the open position to the closed position, the engaging pin 95 is moved while the top transport block 9 is supported by hand, and then engaged with a predetermined engaging portion 96.

The transport block 9 is locked in the closed position by lock levers 92A and 92B arranged at both sides of the top transport block 9 and lock pins (not illustrated) that engage with the recess portions formed in the lock levers 92A and 92B. Note that one end of the lock lever 92A, 92B is attached to the top transport block 9 together with a spring mechanism (not illustrated) that urges the lock lever 92A, 92B.

A sensor mechanism is arranged to the bottom transport stage 8 and the top transport block 9 for detecting the position of the information medium 2. The information media processing device 1 shown in FIG. 1 has a sensor mechanism composed of a light-emitting device 60 (60A, 60B and 60C) arranged in the bottom transport stage 8 and a light-receiving device 61 (61A, 61B and 61C) arranged in the top transport block 9. As an example of the sensor mechanism, an optical sensor can be named in which the light-emitting device 60 (60A, 60B and 60C) and the light-receiving device 61 (61A, 61B and 61C) are opposed to each other and the light-receiving device 61 detects that the light emitted from the light-emitting device 60 is intercepted by the information medium 2, to determine the presence or position of the information medium 2.

Also, in the top transport block 9, a magnetizing head 71 and a magnetic head 70 are arranged, the magnetizing head 71 magnetizing the MICR data written on the front face of the information medium 2 and the magnetic head 70 reproducing the MICR data which has been magnetized by the magnetizing head 71. In the bottom transport stage 8, the pad roller 24 opposed to the magnetizing head 71 is arranged in parallel to the transport roller 20B. Also, in the bottom transport stage 8, the pad roller 23 opposed to the magnetic head 70 is arranged in parallel to the transport roller 20C.

(Configuration of Retract Passage)

As shown in FIG. 2, the information media processing device 1 of this embodiment is equipped with a second transport passage 52 as a retract passage (hereinafter denoted to a retract passage 52) into which at least part of the information medium 2 is retracted from the first transport passage 145 without exposing the information medium 2 from the media inserting portion 3. The retract passage is connected to the first transport passage 145. In this embodiment, the retract passage 52 is formed such that it diverges from the first transport passage 145 at the front side of the transport passage 10. Also, the retract passage 52 is configured by a curve portion 52a, the top end of which is connected with the first transport passage 145, a straight line portion 52b which is connected with the bottom end of the curve portion 52a, and an inclined portion 52c which is connected with the bottom end of the straight line portion 52b; it is formed to curve downwardly on the whole.

The curve portion 52a is formed with a curved surface rounded out toward the front side. The straight line portion 52b is formed with a flat surface parallel to the top-bottom direction of FIG. 2. The inclined portion 52c is formed with a flat surface as well as with a downward inclination toward the inside. For this reason, the information medium 2 which is to be transported in the retract passage 52 is first transported toward the front and then toward the inside. Note that the retract passage 52 may be formed by the curve portion, the top end of which is connected to the first transport passage 145.

Provided at the border portion between the first transport passage 145 and the retract passage 52 is a switching lever (hereinafter denoted to a switching lever 51) as a transporting-direction switching means (diverging means) 51 that enables the transportation of the information medium 2 from the first transport passage 145 either to the media inserting portion 3 or to the retract passage 52. The switching lever 51 is connected to the solenoid 14 (see FIG. 1) via a predetermined link mechanism (not illustrated), and rotates following the open/close movement of the shutter member 12. More specifically described, when the switching lever 51 is in the open position 51A at which the information medium 2 can be transported from the first transport passage 145 to the media inserting portion 3, the shutter member 12 opens the media passage 11; when the switching lever 51 is in the closed position at which the information medium 2 can be transported from the first transport passage 145 to the retract passage 52, the shutter member 12 closes the media passage 11.

In this embodiment, when the information medium 2 is shifted toward the transporting referential surface 15, the information medium 2 is transported back and forth inside the information media processing device 1 using the retract passage 52, as described later. In other words, when the information medium 2 is moved toward the transporting referential surface 15, the switching lever 51 is in the closing position 51B.

Note that the retract passage 52 also functions as a card-collecting passage for collecting the information medium 2 which is determined necessary for collection after the information reading by the scanner 30 and the magnetic head 70. More specifically described, the information medium 2 inserted at the media inserting portion 3 is transported to the inside by the rotations of the transport rollers 20E, 20A, 20B, 20C and 20D, as described later, so that the character information on the information medium 2 is read; when a host computer 146 judges that the information medium 2 needs to be collected, the rotation of the transport rollers 20A-20D is reversed to return the information medium 2 to the front side. At that time, the switching lever 51 is in the closing position 51B, and the information medium 2 returned to the front side is sent to the retract passage 52 and then sent to a collection area 53 by the transport rollers 20F and 20G in the retract passage 52.

(Configuration of Transporting Means)

Figure 5:
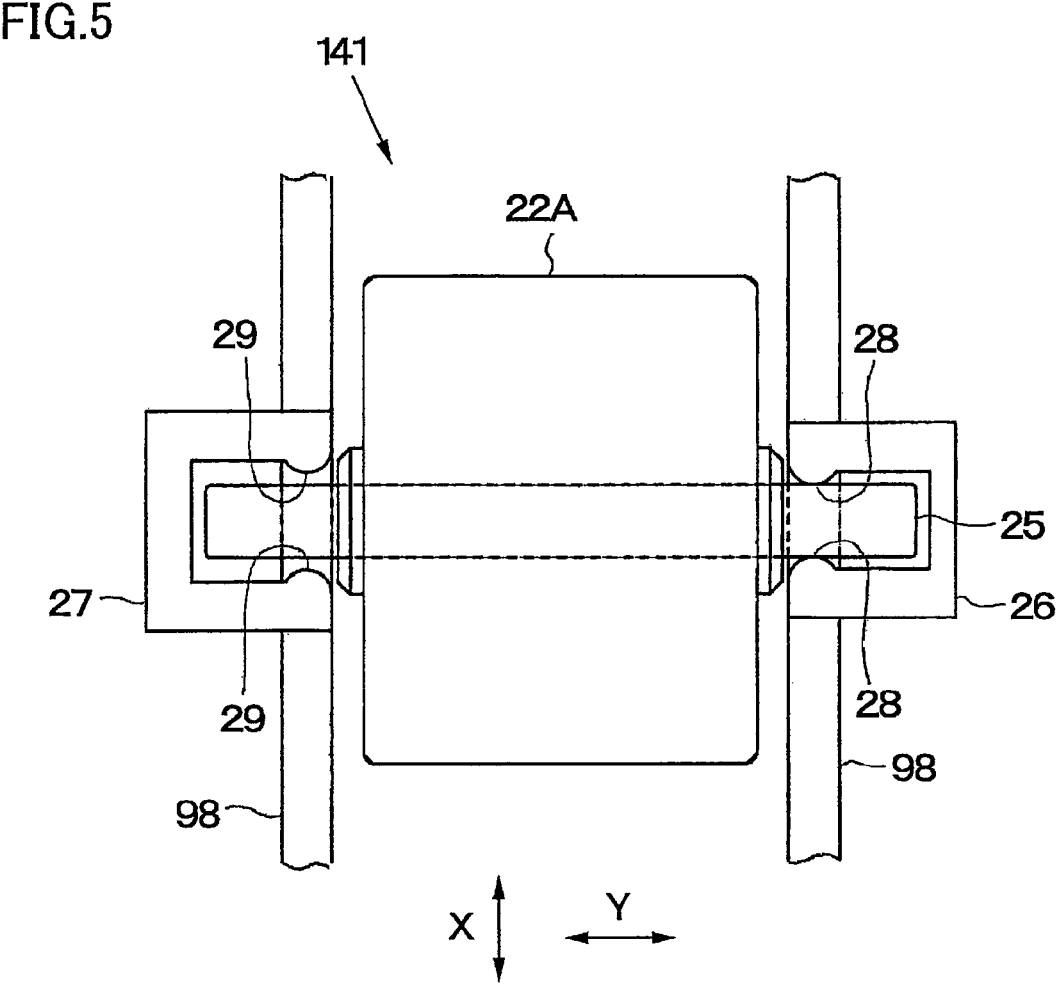
[FIG. 5] A plan view of the configuration of a pad roller of in FIG. 1 and its peripheries.
Figure 6A:
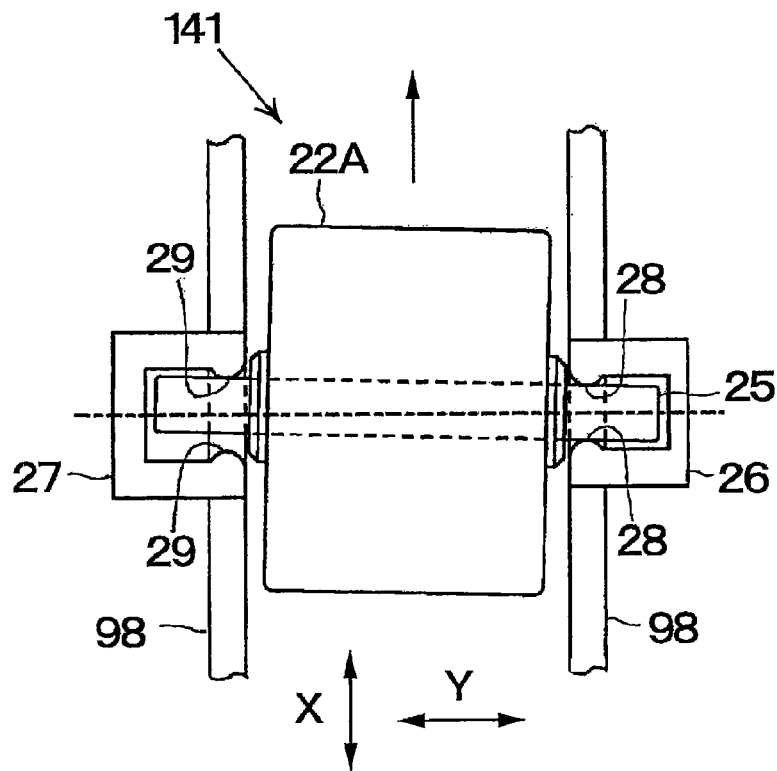
[FIG. 6] Diagrams to explain the operation of the pad roller of FIG. 5: (A) is the status of the pad roller when the medium is transported to the inside; (B) is the status of the pad roller when the medium is transported to the front.
Figure 6B:
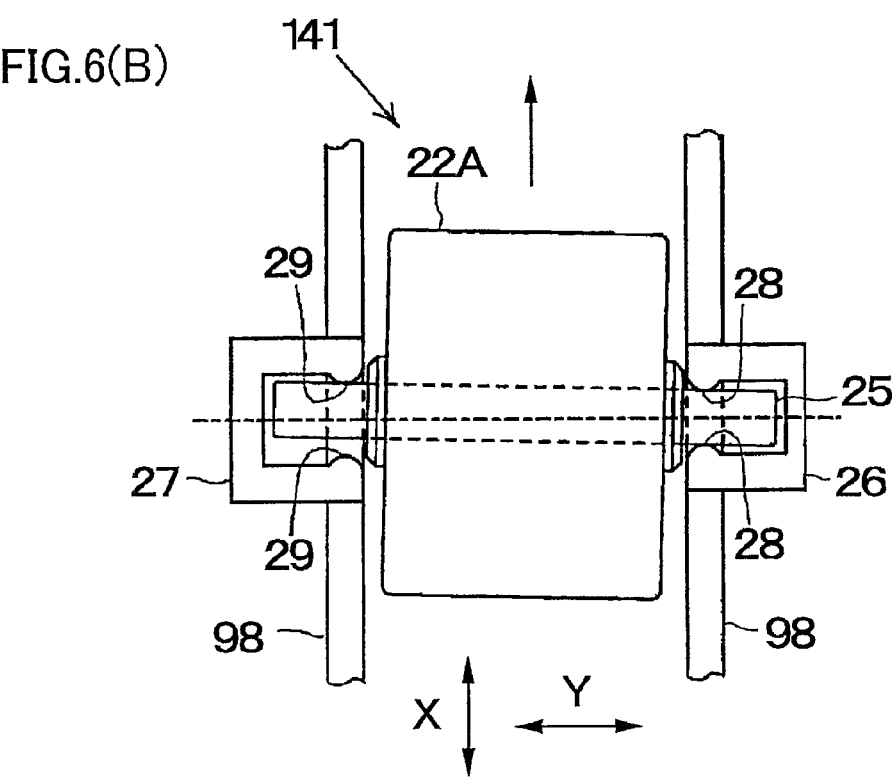

FIG. 5 is a plan view of the configuration of the pad roller 22A of FIG. 1 and its peripherals. FIG. 6 contains diagrams to explain the movement of the pad roller 22A: (A) indicates the status of the pad roller 22A when the information medium 2 is being transported to the inside; (B) indicates the status of the pad roller 22A when the information medium 2 is being transported to the front side.

The transporting means 142 for transporting the information medium 2 is equipped with the transport roller 20 which is a drive roller driven by a drive motor 120 as a drive source (see FIG. 2) and the pad roller 22 which is a dependent roller opposed to the transport roller 20. The information medium 2 is transported by the driving force of the transport roller 20 while sandwiched between the transport roller 20 and the pad roller 22.

In this embodiment, four pairs of transport rollers 20A-20D and pad rollers 22A-22D are arranged in the first transport passage 145. More specifically described, the transport rollers 20A-20D and the pad rollers 22A-22D are arranged in this order from the front side to the inside. A pair of transport rollers 20E and pad roller 22E are arranged between the first transport passage 145 and the medium inserting portion 3, and the two pairs of transport rollers 20F and 20G and pad rollers 22F and 22G are arranged in the retract passage 52.

Various methods can be adopted as a means of transmitting the driving force of the drive motor 120 to the transport roller 20; for example, in this embodiment, the driving force of the drive motor 120 is, as shown in FIG. 1, transmitted from the pulley 121 arranged to the shaft of the drive motor 120 to the pulleys 128 and 130 via a belt 129; then, the transport rollers 20C and 20D which are arranged on the same axes as those of the pulleys 128 and 130 start rotating. Also, a transmitting means of the same kind is used to transmit the driving force of the drive motor 120 to the other transport rollers 20A and 20B to rotate the transport rollers 20A and 20B.

Also, a transmitting means of the same kind is used to transmit the driving force of the drive motor 120 to the transport roller 20E arranged between the first transport passage 145 and the media inserting portion 3 and the transport rollers 20F and 20G arranged in the retract passage 52 to rotate the transport rollers 20E, 20F and 20G. Note that another drive motor other than the drive motor 120 may be provided as a drive source of the transport rollers 20F and 20G. At that time, the driving force of another drive motor is transmitted through the pulleys 131, 132 and 133 and the belt 134 shown in FIG. 1, for example.

The pad rollers 22A-22G urged respectively toward the transport rollers 20A-20G rotate following the driving force of the transport roller 20. Although the urging means is not specified, a coil spring is usually used. In this embodiment, the pad rollers 22A-22D are the opposing rollers which are opposed to the transport rollers 20A-20D arranged in the first transport passage 145.

As shown in FIG. 5, the pad roller 22A is fixed coaxially to a rotary shaft 25. One end of the rotary shaft 25 is rotatably supported by a bearing 26, and the other end of the rotary shaft 25 is rotatably supported by a bearing 27. The bearing 26 is arranged on the transporting referential surface 15 side (on the deep inside on a paper in the Y direction of FIG. 1); the bearing 27 is arranged on the opposite side from the transporting referential surface 15 (on the front side on a paper in the Y direction of FIG. 1). Also, the bearings 26 and 27 are fixed to bearing fixing portions 98 formed to the guide member 90.

As shown in FIG. 5, two shaft-supporting portions 28 are formed to the bearing 26 for supporting the rotary shaft 25 in the media transporting direction X. Also, two shaft-supporting portions 29 are formed to the bearing 27 for supporting the rotary shaft 25 in the media transporting direction X.

The distance between the two shaft-supporting portions 28 in the media transporting direction X is equal to or slightly greater than the diameter of the rotary shaft 25. On the other hand, the distance between the two shaft-supporting portions 29 in the media transporting direction X is greater than the diameter of the rotary shaft 25. Therefore, the rotary shaft 25 can be inclined having one end as a fulcrum. In other words, the other end of the rotary shaft 25 can be displaced in the media transport direction X using the one end as a fulcrum. In this manner, the pad roller 22A is supported by the bearings 26 and 27 via the rotary shaft 25 such that the end of the pad roller 22A opposite from the transporting referential surface 15 can be displaced in the media transporting direction X.

In this embodiment, as shown in FIG. 5, under the condition where the axial direction of the pad roller 22A (i.e., the axial direction of the rotary shaft 25) is coincided with the media width direction Y, a gap is created between the shaft-supporting portion 29 arranged on the front side and the rotary shaft 25 and another gap is also created between the shaft-supporting portion 29 arranged inside and the rotary shaft 25. Therefore, the other end of the rotary shaft 25 (i.e., the other end of the pad roller 22A) can be displaced from the position, at which the axial direction of the pad roller 22A is coincided with the media width direction Y, to the both sides in the media transporting direction X.

More specifically described, in the status shown in FIG. 5, the gap between the shaft-supporting portion 29 arranged on the front side and the rotary shaft 25 is equal to the gap between the shaft-supporting portion 29 arranged inside and the rotary shaft 25, and the other end of the rotary shaft 25 can be displaced from the position, at which the axial direction of the pad roller 22A is coincided with the media width direction Y, to both sides in the media transporting direction X by equal amount.

When the information media 2 is transported toward the inside while sandwiched between the transport roller 20A and the pad roller 22A, friction is caused between the information medium 2 and the pad roller 22A; the other end of the rotary shaft 25 is displaced by the friction toward the inside having the one side of the rotary shaft 25 (the transporting referential surface 15 side) as a fulcrum until it comes to contact with the shaft-supporting portion 29 arranged inside, as shown in FIG. 6 (A). In other words, the other end side of the pad roller 22A is displaced toward the inside so that the pad roller 22A inclines to the direction in which the information medium 2 being transported toward the inside is shifted toward the one end side (the transporting referential surface 15 side).

Also, when the information medium 2 is transported to the front side while sandwiched between the transport roller 20A and the pad roller 22A, friction is caused between the information medium 2 and the pad roller 22A; as shown in FIG. 6 (B), the other end of the rotary shaft 25 is displaced by the friction force toward the front having the one end of the rotary shaft 25 (the transport reference plane 15 side) as a fulcrum until it comes to contact with the shaft support portion 29 arranged on the front side. In other words, the other end of the pad roller 22A is displaced toward the front so that the pad roller 22A inclines to the direction in which the information medium 2 being transported toward the front is shifted toward the one end side (the transporting referential surface 15 side).

In the same manner as the pad roller 22A, the pad rollers 22B-22E are also fixed coaxially to the rotary shaft 25 which is rotatably supported by the bearings 26 and 27. Therefore, the pad rollers 22B-22E also incline according to the transporting direction of the information medium 2 in the same manner as the pad roller 22A.

By supporting the pad rollers 22A-22E to freely be displaced with the bearings 26 and 27 according to the right or reverse direction of the transport direction, the pad rollers 22A-22E are configured as a shifting mechanism 141 that shifts the information medium 2 into the area in which the magnetic head 70 can make a magnetic detection. Note that the configuration of the shifting mechanism 141 is not limited to this; however, as long as the information medium 2 can be shifted into the magnetically-detectable area while being transported, the mechanism is not particularly specified.

Note that, in this embodiment, the distance between the two shaft-supporting portions 29 is so determined that the angles of inclination of the pad rollers 22A-22E gradually decrease from the front side toward the inside. In other words, the distance between the two shaft-supporting portions 29 becomes narrower from the front side toward the inside. Note that the distance between the two shaft-supporting portions 29 may be so determined that the angles of inclination of the pad rollers 22A-22E are the same. Also, the distance between the two shaft-supporting portions 29 may be so determined that the angles of the inclination of the pad rollers 22A, 22B and 22E or the angles of inclination of the 22A and 22E are large while the angles of inclination of the pad rollers 22C and 22D or the pad rollers 22B-22D are small, for example.

On the other hand, the pad rollers 22F and 22G are coaxially fixed to the rotary shaft 25 which is rotatably supported with both ends thereof by the bearing 26. Therefore, even when the information medium 2 is transported while sandwiched between the transport rollers 20F and 20G and the pad rollers 22F and 22G, the pad rollers 22F and 22G will not incline. Note that the pad rollers 22F and 22G may be coaxially fixed to the rotary shaft 25 which is rotatably supported by the bearings 26 and 27 in the same manner as the pad roller 22A. In other words, although the pad rollers 22F and 22G are not configured as the shifting mechanism 141 in this embodiment, they may be configured as the shifting mechanism 141.

(Configuration of Scanner)

FIG. 7 is a schematic cross-sectional view showing the positional relationship between the scanners and the fur brush roller 40 illustrated in FIG. 2.

The scanner 30 as the image reading means is provided in two locations, one on the top side and another on the bottom side of the first transport passage 145 in the example shown in FIG. 1 and FIG. 2; however, it may be provided on only one side. The scanner 30 primarily scans in the media width direction Y orthogonal to the media transporting direction X in which the information medium 2 is transported, and secondarily scans in the media transporting direction X to read the image data (such as character information and image data) printed on the information medium 2. The surface of the scanner on the first transport passage 145 side is a reading surface 31 as shown in FIG. 7, and is usually a glass surface. The image data read by the scanner 30 is sent to the host computer and the following transporting operations are controlled. Note that, as shown in FIG. 7, it is preferred that tapered members 32A and 32B which will not hinder the transportation of the information medium 2 be provided before and after the reading surface 31 of the scanner 30 in the media transporting direction X.

(Configuration of Fur Brush Roller)

The fur brush roller 40 is opposed to the reading surface 31 of the scanner 30 as shown in FIG. 2 and FIG. 7. The fur brush roller 40 is of a general form in which yarns 41 are planted on a planting base 42 around a shaft 43 (see FIG. 4); however, it is not limited to this form. For example, a sheet-like planting base 42 on which a flock of yarn is planted may be wound around the shaft 43 and glued with an adhesive.

The "yarn" of which the fur brush roller 40 is constructed may be resin fiber such as polyester (for example, polyethylene terephthalate), acrylic or nylon. Also, it is preferred that the fur brush roller 40 have conductivity, and it may be a compound brush of the aforementioned resin fiber and a conductive fiber (such as a carbon fiber), or a resin fiber containing a conductive material (such as carbon particles or conductive metal particles) may be used. By giving conductivity to the fur brush roller 40, static that may be caused in the information medium 2 can be eliminated. It is preferred that the electric resistance of the yarn of the fur brush having conductivity be less than the range of $1\text{-}1\times10^8$ Ωcm.

More specifically described, it is preferred to use a yarn which has a single yarn fineness of 200-400 dtex (1 dtex (desi tex) is $1.0\times10^4$ m of length and 1 g of weight and a density of 50-100 single yarns/mm$^2$ and which yarn fineness×density]-thereof is within the range of $1.0\times10^4\text{-}4.0\times10^4$. By using a yarn having the yarn fineness within the above range, such effects can be obtained that jamming is prevented on the soft information medium 2 to guide the information medium 2 to the reading surface 31. Preferably recommended as an example is a yarn having a yarn fineness of 260 dtex and a density of 80 single yarns/mm$^2$ (yarn fineness×density=$2.1\times10^4$).

Between the fur brush roller 40 and the reading surface 31 (glass surface) of the scanner 30 is provided a gap G for allowing the information medium 2 to pass through, as shown in FIG. 7. The gap G is set to or less than the thickness of the information medium 2 handled by the information media processing device 1. By setting the gap G in such a way, the fur brush roller 40 regulates the surface 2B (or 2A) of the information medium 2, the opposite side from the surface to be read 2A (or 2B), and guides the information medium 2.

It is preferred that the gap G is adjusted according to the type of the information medium 2 to be handled; for example, it is preferred that the gap G be adjusted for the information media processing device 1 that handles only soft paper media such as checks or for the information media processing device 1 that handles only paper media thicker and harder than checks.

The fur brush roller 40B arranged in the top transport block 9 is rotated by the power of the drive motor 120. The driving force of the drive motor 120, as shown in FIG. 1, is transmitted to the pulley 121 and then the pulley 122 via the belt 123, further transmitted from the pulley 124 arranged coaxially with the pulley 122 to the pulley (no illustration, arranged coaxially with the gear 126) via the belt 125, and then transmitted to the gear 127 connected to the gear 126 which is coaxial with the pulley which is not illustrated. The fur brush roller 40B is arranged coaxially with the gear 127 and rotated by the power of the drive motor 120 which is transmitted to the gear 127. Note that the power of the drive motor 120 is transmitted to the fur brush roller 40A arranged in the bottom transport stage 8 by the same kind of transmitting means; thus, the fur brush roller 40A is also rotated by the power of the drive motor 120.

(Configuration of Guide Member)

Figure 8:
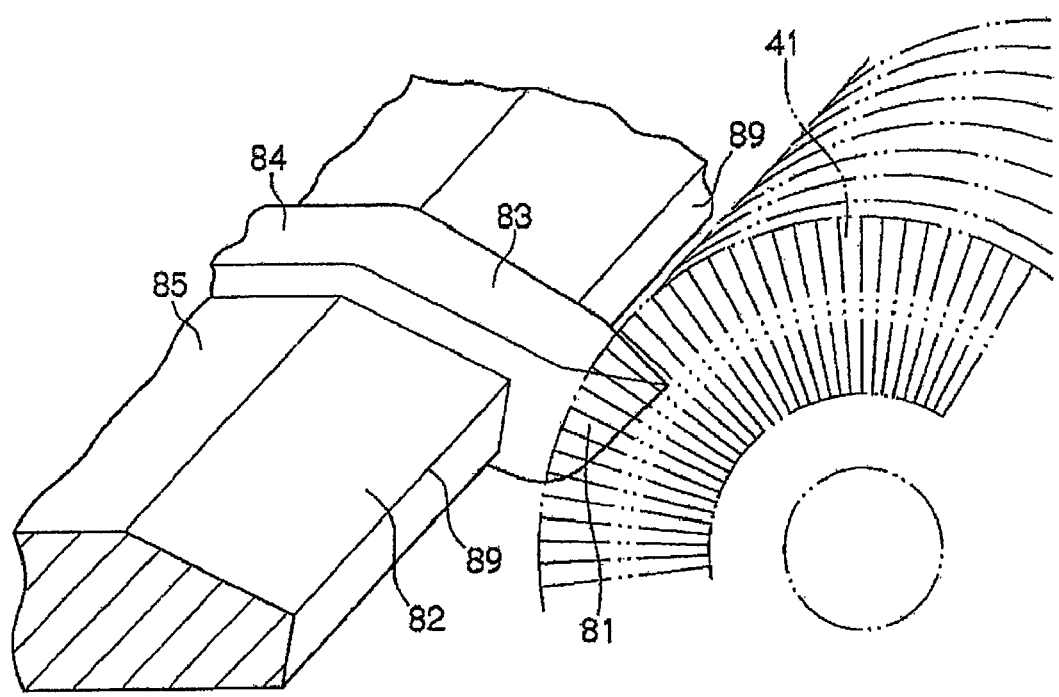
[FIG. 8] A schematic diagram of a protrusion that pushes the fiber on the brush roller of FIG. 1 aside.

FIG. 8 is a schematic diagram of a protrusion 81 which pushes aside the yarns 41 of the fur brush roller 40 shown in FIG. 1.

The guide members 80 and 90 function, as shown in FIG. 4, FIG. 7 and FIG. 8, cooperating with the fur brush roller 40. This is one of the features of this embodiment. More specifically described, the guide member 80 is arranged in the bottom transport stage 8 in which the fur brush roller 40 is also arranged; it has a flat surface 85 and multiple slit guides 84, the flat surface 85 regulating the first transport passage 145 on the fur brush roller 40 side and the slit guides 84 being formed in the flat surface 85 on the first transport passage 145 side, extending along the media transporting direction X. The slit guides 84 function to assist the information medium 2 to be transported along the media transporting direction X and are configured as protrusions which protrude by a predetermined height on the flat surface 85 and are spaced arbitrarily.

The guide member 80 is formed with a window portion 88 and multiple protrusions 81A and 81B; the window portion 88 having the fur brush roller 40 attached and being exposed to the first transport passage 145, and the protrusions 81A and 81B being opposed to the fur brush roller 40 at the edge 89 of the window portion 88 and projecting in the direction parallel to the media transporting direction X to push aside the yarns 41 on the fur brush roller 40. The protrusions 81A and 81B are, as shown in FIG. 8, formed in a triangle bow shape, the cross-section of which is tapered toward the fur brush roller 40. Note that the penetration depth of the protrusion 81A, 81B with respect to the fur brush roller 40 is preferably 1-2 mm, for example.

The adjacent portion of the guide member 80, which is adjacent to the window portion 88 (i.e., the portion between the edge 89 of the window portion 88 and the flat surface 54 in the media transporting direction X) is formed as an inclined surface 82, as shown in FIG. 7 and FIG. 8, which gradually parts from the first transport passage 145 toward the fur brush roller 40 in the media transporting direction X.

Also, as shown in FIG. 4, formed to the guide member 80 is a scanner-attaching portion 86 as well as a roller-attaching portion 87 (87A~87C).

The guide member 90 is arranged in the top transport block 9 in which the fur brush roller 40 is also arranged. The guide member 90 is configured in the same manner as the guide member 80; therefore, the detailed description of the guide member 90 is omitted.

The controller 143 is a micro computer, for example, which controls the information media processing device 1 according to the program saved in memory in advance. In the memory device of the controller 143 is saved in advance a reference value, n, which is a threshold value used for judging if the off-track condition is caused. The controller 143 operates the transporting means 142 and the shutter member 12 based on the signal from the insertion-detecting sensor 13 to take the information medium 2 inside the device, and operates the image-reading means 30 to image the information medium 2 in order to determine if the medium is off-track, based on the image data. When the medium is off-track, the controller 143 operates the transporting means 142 and the switching lever 51 to perform a shifting operation.

In the information media processing device 1 configured in the above manner, the information medium 2 is taken inside the device in the following manner. Note that this embodiment uses the image data read by the scanner 30B arranged in a position closer to the magnetic head 70, out of the two scanners 30A and 30B for off-track judgment. Note that, instead of the image data read by the scanner 30B, the image data read by the scanner 30A may be used for judgment, or the image data read by both of the scanners 30A and 30B may be used.

In other words, when the device is on stand-by waiting for the insertion of an information medium 2 with the control demand from the host computer 146, the controller 143 determines if either of the insertion-detecting sensors 13A and 13B have detected the information medium 2 (Step S30).

When the insertion-detecting sensor 13B detects the information medium 2, the controller moves the shutter member 12 to open the media passage 11; when the insertion-detecting sensor 13A detects the information medium 2, the controller starts the transporting means 142 such as the transport roller 20 to transport the information medium 2 toward the inside to a predetermined position in the information media processing device 1. The scanners 30A and 30B read the image of the information medium 2, the magnetizing head 71 magnetizes the MICR data on the front surface of the information medium 2, and the magnetic head 70 reads the MICR character (reads the MICR data). Note that, when the information medium 2 is transported to the predetermined position in the information media processing device 1, the shutter member 12 closes the media passage 11 and the switching lever 51 is rotated to the closing position 51B.

Then, the controller 143 processes the image data 147 (FIG. 2) read by the scanner 30B to detect the reference edge 2c of the information medium 2 (Step S31). Note that a publicly-known means can be used for detecting the reference edge 2c in the image data 147 through the imaging process, and its description is omitted here. Also, in this embodiment, the detection of the reference edge 2c is not performed over the entire length, but judgment positions are set at predetermined intervals and the reference edge 2c is detected at every judgment position. By performing the detection of the reference edge 2c at every predetermined interval, the processing time can be shortened. However, the detection of the reference edge 2c may be performed over the entire length. In this embodiment, the judgment positions are set at 10 mm intervals, for example. The controller 143 detects the reference edge 2c at the first judgment position.

Figure 9:
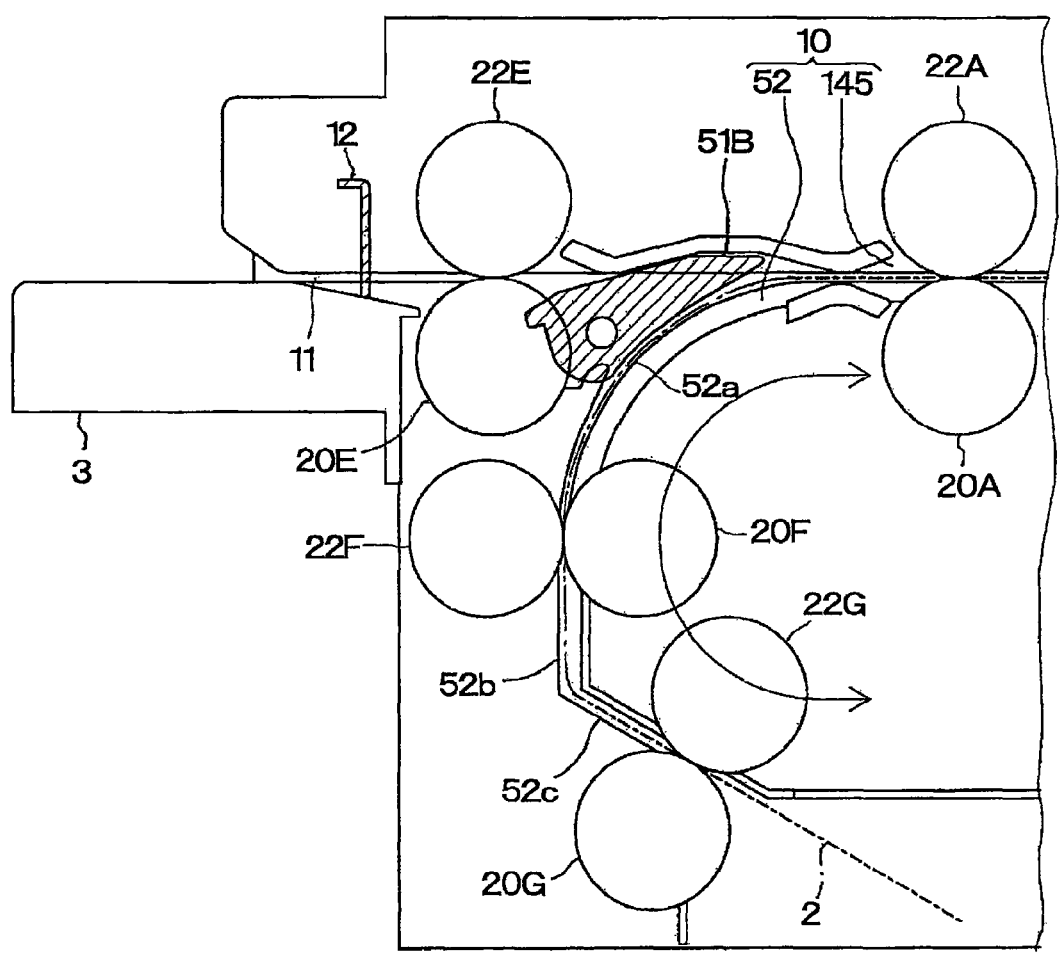
[FIG. 9] A diagram to explain the shifting operation for the media in the information media processing device of FIG. 1.
Figure 10:
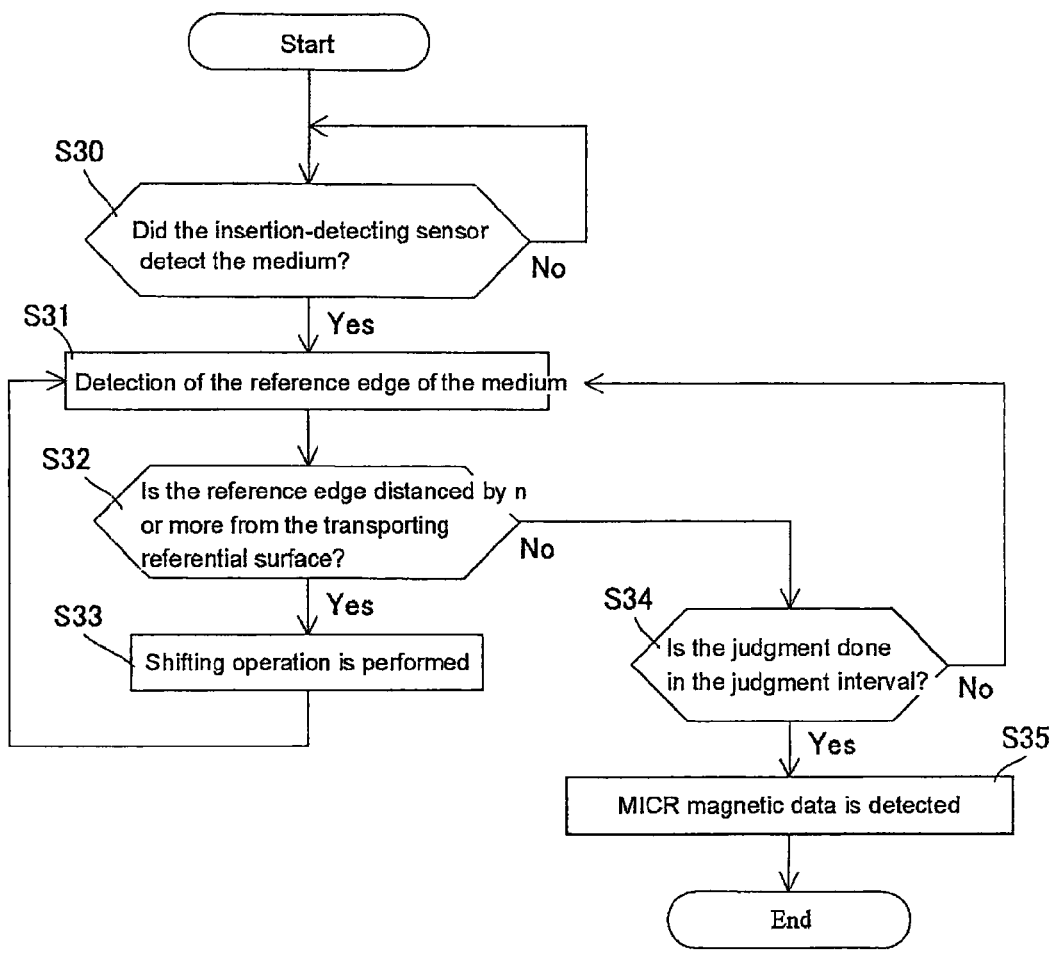
[FIG. 10] A flowchart of a control flow when the medium is taken inside the information media processing device of FIG. 1.
Figure 11:
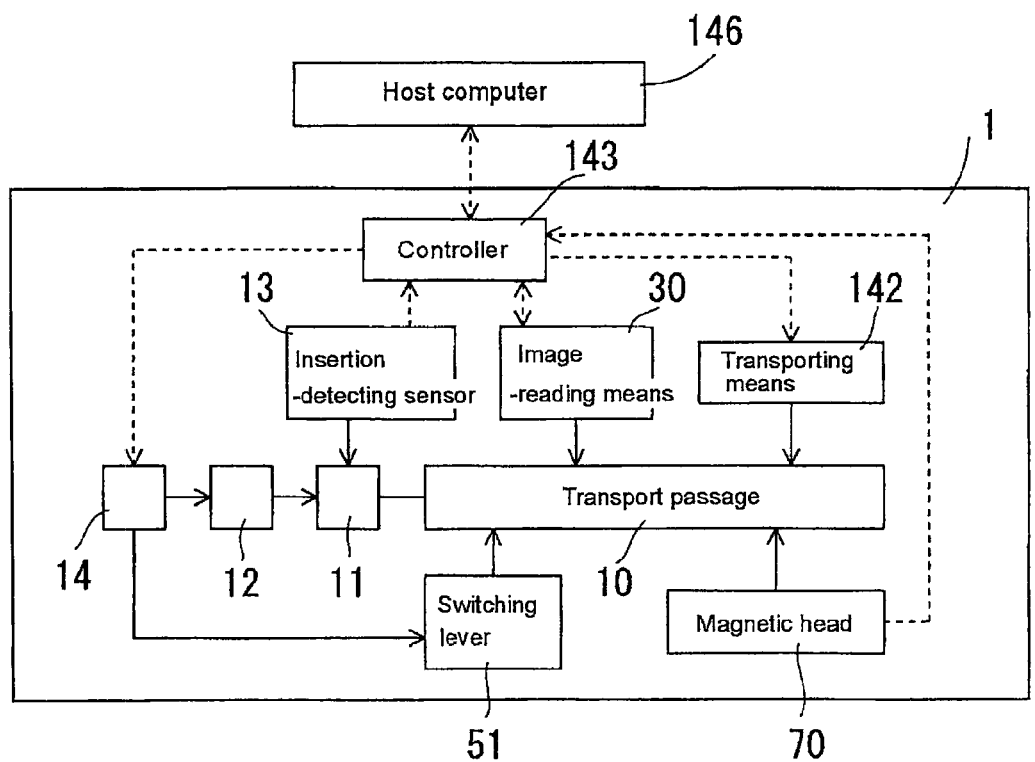
[FIG. 11] A block diagram of the information media processing device of FIG. 1.
Figure 12:
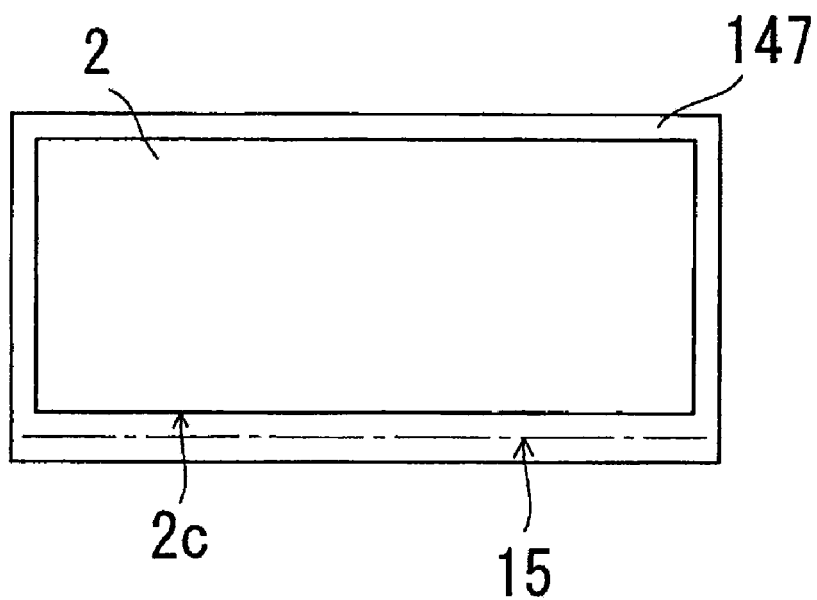
[FIG. 12] A diagram of an image data scanned by the scanner.

Next, the controller 143 judges if, at the first judgment position, the reference edge 2c is distanced by n or more from the transporting referential surface 15 (Step S32). Here, n is a referential value used to determined if the medium is off-track: when the reference edge 2c is distanced by n or more from the transporting referential surface 15 at the judgment position, it can be judged that off-track is caused; when the distance between the reference edge 2c and the transporting referential surface 15 is less than n, it can be judged that the information medium is not off-track. The reference value, n, is a predetermined value and saved in the memory device of the controller 143. When the reference edge 2c is distanced by n or more from the transporting referential surface 15 at the judgment position, the process proceeds to Step S33 at which a shifting operation is performed. More specifically described, as shown in FIG. 9, the information medium 2 is transported back and forth once inside the information media processing device 1 using the retract passage 52. In other words, the information medium 2 is transported back and forth once in the direction of the arrow shown in FIG. 9. At that time, the switching lever 51 is in the closing position 51B. The information medium 2 that has traveled back and forth is shifted toward the transporting referential surface 15 by the operation of the shifting mechanism 141. Even during this transporting, the scanners 30A and 30B read the image data 147 of the information medium 2 and overwrite the memory region of the previously read image data 147 with the image data 147 that has been just read. Also, the MICR characters printed on the front surface of the information medium 2 is magnetized by the magnetizing head 71, the magnetized MICR characters are read by the magnetic head 70, and the MICR data that has just been read overwrites the memory region of the previous MICR data.

Then, the process returns to Step S31; until the distance between the reference edge 2c and the transporting referential surface 15 at the first judgment position becomes less than n, i.e., until the off-track condition of the reference edge 2c at the first judgment position is canceled, the process performs the shifting operation on the information medium 2 by repeating Steps S31→S32→S33→S31.

When the off-track condition at the first judgment position is resolved, the process proceeds from Step S32 to Step S34 at which it will be determined if the information medium is off-track in all the judgment intervals, i.e., all the judgment positions.

If the judgment has not been completed for all the judgment positions, the controller 143 returns the process to Step S31 at which the reference edge 2c is detected for the next judgment position; until the off-track condition is resolved, the process repeats Steps S31→S32→S33→S31. Until the judgment is completed for all the judgment positions, the process repeats Steps S31 through S34.

When the judgment is completed for all the judgment positions, the process proceeds from Step S34 to Step S35 at which the overwritten (read) MICR data is decoded, and the process ends.

Thus, in the information media processing device 1 of the present invention, the off-track condition is determined based on the reference edge 2c of the information medium 2 detected from the read image; therefore, the imaging process is remarkably easy. In other words, the imaging process in which the reference edge 2c is detected from the image is very easy and takes little time compared to the imaging process in which the MICR characters are detected from the image and decoded. Thus, the off-track condition can be found more quickly and easily. In other words, by detecting the reference edge 2c of the information medium 2 from the image data 147, the off-track condition can be detected more quickly and easily than the optical recognition of the MICR characters.

Also, by detecting the reference edge 2c at multiple judgment positions, accuracy of the detection can be maintained while the process can be performed quickly.

Since the position of the reference edge 2c is determined at multiple judgment positions, the completion of shifting can be determined even with the configuration of this embodiment in which the gradual shifting operation is performed during the transporting; since there is no need to judge the reference edge 2c of the information medium 2 in its entirety, the process can be performed faster.

When the shifting of the information medium 2 is not completed, the process of re-transporting is performed automatically by the information media processing device 1 before the recognition of the MICR magnetic data; therefore, the processing time by a system constructed with the information media processing device 1 can be shortened.

When the shifting is completed, the MICR data is decoded immediately, that is, without transporting the information medium 2 for re-reading; therefore, there is no wasted operation when the transporting condition is not off-track, making the process faster.

Also, the information medium 2 can be shifted while being transported; therefore, there is no need to provide additional components such as a shifting plate, thus preventing the device from being large and expensive.

Various kinds of information media 2 having different widths are generally used as the information medium 2 for transactions. Note that, even when the widths of the information media 2 are different, the distance from the reference edge 2c to the MICR character printing position 140 is standardized. Since the width of an information media 2 which is to be inserted at the media-inserting portion 3 of the information media processing device 1 is not uniform as described above, or the information media 2 inserted carelessly to some extent can be taken inside because of operability, the media-inserting portion 3 is given a wider width to accept any information media 2. Therefore, the information medium 2 is not always inserted in such a way that the reference edge 2c makes contact with the transporting referential surface 15 of the first transport passage 145. For this reason, the transporting means 142 of the information media processing device 1 is equipped with the shifting mechanism 141. However, the shifting mechanism 141 cannot be large-scale because of the device downsizing, and therefore, the mechanism can move the medium only small distance by a single operation; therefore, when the reference edge 2c is greatly displaced from the transporting referential surface 15, the reference edge 2c may not be aligned with the transporting referential surface 15 by running the shifting operation only a few times. For this reason, the device first detects if the magnetic head 70 is outside the location of the MICR characters, i.e., if the information medium is off-track; if the information medium is off-track, the off-track condition is first resolved, and then magnetism of the MICR characters is detected.

In this embodiment, the insertion-detecting sensor 13 which detects the insertion of the information medium 2 at the media-inserting portion 3 is arranged in the vicinity of the line extended from the transporting referential surface 15 of the first transport passage 145 so that the position of the reference edge 2c is approximately aligned with that of the transporting referential surface 15 at the time of insertion of the information medium 2. In other words, when the information medium 2 is inserted at the media-inserting portion 3 under the condition in which the reference edge 2c of the information medium 2 is greatly displaced from the transporting referential surface 15 of the first transport passage 145, the information medium 2 is not detected by the insertion-detecting sensor 13 and therefore it will not be accepted to the first transport passage 145. In this way, the shifting of the information medium 2 which is taken into the first transport passage 145 can be promptly completed. Note that the positioning of the insertion-detecting sensor 13 is not limited to the above-described embodiment.

Also, in this embodiment, the positional relationship between the mounted scanners 30A and 30B and the transporting referential surface 15 is calculated in advance and saved in the memory device of the controller 143. For example, the position of the transporting referential surface 15 is studied by the scanners 30A and 30B and the information is saved in the memory device such as a non-volatile memory during the inspection of the information media processing device 1 before shipping from the plant. By studying the positional relationship between the scanners 30A and 30B and the transporting referential surface 15 in advance, the mounting position of the scanners 30A and 30B can be approximately adjusted, improving productivity. In addition, the judgment on the shifting of the information medium 2 can be performed more precisely. In other words, the judgment on the shifting of the information medium 2 may be performed based on only the positional relationship between the transporting referential surface 15 and the reference edge 2c without considering the positional relationship between the scanners 30A and 30B and the transporting referential surface 15; however, as in this embodiment, the positional relationship between the scanners 30A and 30B and the transporting referential surface 15 may be considered for the judgment so that a more precise judgment can be performed. By studying the positional relationship between the scanners 30A and 30B and the transporting referential surface 15 in advance, variations in the mounting positions of the scanners 30A and 30B and in the reading-starting position will be less.

In this embodiment, the pad rollers 22A-22D are supported by the bearings 26 and 27 such that the ends thereof (the end opposite from the transporting referential surface 15) can be displaced in the media-transporting direction X (the shifting mechanism 141). Therefore, when the information medium 2 being transported makes contact with the pad rollers 22A-22D, friction is caused between the information medium 2 and the pad rollers 22A-22D; because of the friction, the pad rollers 22A-22D incline in the direction to shift the information medium 2 toward the transporting referential surface 15 having their ends on the transporting referential surface 15 side as fulcrums. Thus, by the operation of the pad rollers 22A-22D, the information medium 2 in the transporting can be smoothly shifted toward the transporting referential surface 15.

Properly setting the amount of displacement of the pad rollers 22A-22D (more specifically, properly setting the distance between the two shaft support portions 29) can prevent the information medium 2, which needs to be shifted toward the transporting referential surface 15, from receiving excessive load, i.e., from hitting the transporting referential surface 15 too hard. Therefore, even when the physically-weak information medium 2 is inserted, damage [to the medium] during the transporting can be prevented.

In this embodiment, in order to shift the information medium 2 toward the transporting referential surface 15, the retract passage 52 is used to transport the information medium 2 back and forth inside the information media processing device 1. In other words, in this embodiment, the retract passage 52 is formed to transport the information medium 2 back and forth for the shifting operation. Therefore, the space for arranging the first transport passage 145 and the retract passage (the second transport passage) 52 can be small compared to the configuration in which, in place of forming the retract passage 52, the transport passage 10 is used as a circulating passage to circulate the information medium 2 inside the device for the shifting operation (the circulation transporting). As a result, the size of the information media processing device 1 can be minimized.

Although the information media processing device 1 is small, no part of the information medium 2 will be exposed at the media-inserting portion 3 during processing, thus preventing operational error which could be caused by a user.

In this embodiment, the retract passage 52 is used to transport the information medium 2 back and forth when the information medium 2 is shifted toward the transporting referential surface 15; therefore, the distance of transporting the information medium 2 when shifting the information medium 2 toward the transporting referential surface 15 can be shortened, compared to the configuration in which the information medium 2 is transported in circulation. Therefore, the processing time on the information medium 2 can be shortened. Also, in this embodiment, four [pairs of] transport rollers 20A~20D and pad rollers 22A~22D are arranged in the first transport passage 145; therefore, the information medium 2 can be shifted toward the transporting referential surface 15 in a shorter period of time, compared to the configuration in which the transport rollers are arranged in the vicinity of the border between the flat surface portion and the curved surface portion.

In this embodiment, the first transport passage 145 is formed in a straight line so that the information medium 2 being transported can travel straight ahead, and the retract passage 52 is formed to curve downwardly below the first transport passage 145. Therefore, the size of the information media processing device 1 can be minimized in the media transporting direction X. Also, the first transport passage 145 is formed in a straight line; therefore, the information medium 2 being transported in the first transport passage 145 can be protected from damage more easily. Note that it is not necessary that the first transport passage 145 be formed in a straight line.

In this embodiment, the switching lever 51 is arranged at the border portion between the first transport passage 145 and the retract passage (second transport passage) 52. Therefore, when transported back and forth, the information medium 2 can be guided to the retract passage 52 by the transporting means 142 with certainty.

In this embodiment, the other ends of the pad rollers 22A-22D can be displaced from their positions, at which the axial direction of the pad rollers 22A-22D is coincided with the media-width direction Y, to both sides in the media-transporting direction X. Therefore, either when the information medium 2 is transported toward the inside or transported toward the front side, the information medium 2 can be shifted toward the transporting referential surface 15 with the operation of the pad rollers 22A-22D. In this way, the information medium 2 can be shifted toward the transporting referential surface 15 in a short period of time.

In this embodiment, when the information medium 2 is detected by both of the two insertion-detecting sensors 13A and 13B, the shutter member 12 opens the media passage 11 and the transporting means starts moving. In other words, when the two insertion-detecting sensors 13A and 13B both detect the information medium 2, the acceptance of the information medium 2 to the information media processing device 1 is enabled. Therefore, when the end portion of the information medium 2 in the media-width direction Y is in a position close to the transporting referential surface 15, the information medium 2 is taken into the information media processing device 1. Thus, in this embodiment, the accepted information medium 2 can be shifted toward the transporting referential surface 15 in a short period of time.

Note that, although the above-described embodiment is an example of preferred embodiment, the present invention is not limited to this embodiment, but can be variously modified within the scope of the invention.

For example, in the above description, the image data 147 is read by the scanner 30B every time the information medium 2 is transported, but this repeated reading is not necessary. For example, when the shifting distance L1 by one-time transportation can be known, the image data 147 may be read only at the first transporting. In other words, the distance L2 between the reference edge 2c and the transporting referential surface 15 may be computed by using the image data 147 read at the first transporting, the number of repetitions of the shifting operation may be obtained based on the distance L1 and L2 (=L2/L1: rounding up decimal), and then the transporting may be repeated by the calculated number of times. This can eliminate the operation of the scanner 30B for reading the image data 147 at the second and each successive transporting, thus shortening the processing time.

Also, the positional relationship between the mounted transporting referential surface 15 and magnetic head 70 may be studied in advance. By studying the positional relationship between the transporting referential surface 15 and the magnetic head 70 in advance, accuracy in detection of the off-track condition as well as the margin can be improved. In other words, since the positional relationship between the magnetic head 70 and the transport passage 10 is accurate in this way, the magnetic heard 70 can detect the MICR characters with certainty.

In this embodiment, by coinciding the reference edge 2c with the transporting referential surface 15, the information medium 2 can be shifted to the area in which the magnetic head 70 can magnetically detect the MICR characters. Note that the method is not limited to this. By shifting the information medium 2 into the position at which the distance between the reference edge 2c and the transporting referential surface 15 is of a predetermined value, the information medium 2 may be shifted to the area in which the MICR reading head 6 can magnetically detect the MICR characters.

Also, in the above-described embodiment, the other end of the rotary shaft 25 is displaceable from the position, at which the axial direction of the pad rollers 22A-22E is coincided with the media-width direction Y, to both sides in the media-transporting direction X by an equal amount. Beside this, the displacement of the other end of the rotary shaft 25 toward the front from the position, at which the axial direction of the pad rollers 22A-22E is coincided with the media-width direction Y, may be different from its displacement to the inside.

In the above-described embodiment, the other end of the rotary shaft 25 is displaceable from the position, at which the axial direction of the pad rollers 22A-22E is coincided with the media-width direction Y, to both sides in the media-transporting direction X; however, it may be displaceable from the position, at which the axial direction of the pad rollers 22A-22E is coincided with the media-width direction Y, only to one side (to the front side or to the inside) in the media-transporting direction X.

In the above-described embodiment, the distance between the two shaft-supporting portions 29 created in the bearing 27 is constant. Also, the information media processing device 1 may be equipped with a displacement adjusting means which adjusts the distance between the two shaft-supporting portions 29 to adjust the amount of displacement of the pad rollers 22A-22E on the side opposite from the transporting referential surface 15. In this case, the amount of displacement of the pad rollers 22A-22E can be set according to the physical strength of the information medium 2. In other words, the inclination of the pad rollers 22A-22E can be set according to the physical strength of the information medium 2. Therefore, excessive load is not exerted on the information medium 2 traveling toward the transporting referential surface 15. In this way, damage to the physically weak information medium 2 can be prevented with certainty during the transporting. Also, the relatively physically strong information medium 2 can be shifted toward the transporting referential surface 15 in a short period of time.

In the above-described embodiment, the retract passage 52 is diverged at the front side of the first transport passage 145. The retract passage 52 may be formed to diverge from the inside of the first transport passage 145. Also, in the above-described embodiment, the retract passage 52 is formed to curve downwardly below the first transport passage 145; however, it may be formed to curve upwardly above the first transport passage 145.

In the above-described embodiment, the insertion-detecting sensor 13 is provided at two positions at the media-inserting portion 3; however, the installation number is not limited to two. As shown in FIG. 14, as long as at least one insertion-detecting sensor 13A is arranged in the vicinity of the forming position of the transporting referential surface 1, the number of insertion-detecting sensors is not specifically limited.

Note that a printer unit or a stamp unit may be attached inside the information media processing device 1. The printer unit, etc. can be connected to the information media processing device 1 by using a connection flange in the information media processing device 1 and fastening members such as bolts and nuts.

[Description of Code]
2 Information medium
2c Reference edge
3 Media-inserting portion (Insertion slot)
10 Transport passage
22 Roller (Pad roller)
30 Image reading means (Scanner)
52 Second transport passage (Retract passage)
70 Magnetic head
140 Print position
141 Shifting mechanism
142 Transporting means
143 Controller
145 First transport passage
147 Image data of information medium While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An information media processing device for use with an information medium having MICR (Magnetic Ink Character Recognition) characters printed in a predetermined position thereon in a media-transporting direction and distanced from a reference edge of the information media in a media-width direction which is orthogonal to media-transporting, the device comprising:
- a transport passage in which the information medium having MICR characters printed in a predetermined position thereon is transported, the transport passage being provided with a transporting referential surface at one end of the transport passage in the media-width direction as a referential position for the reference edge of the information medium;
- a magnetic head arranged in said transport passage for detecting magnetism of said MICR characters;
- an image reading means arranged in said transport passage for reading an image of said information medium;
- a transporting means arranged in said transport passage and having a shifting mechanism for shifting the information medium so that the information medium is shifted toward the transporting referential surface while being transported and which shifts said information medium into the area in which said magnetic head can detect said magnetism of said MICR characters; and
- a controller which detects a reference edge of said information medium based on the image read by said image reading means and judges based on said reference edge if said print position is distanced by a predetermined amount from the area in which said magnetic head can detect said magnetism of said MICR characters;
- wherein said shifting mechanism includes a roller for shifting comprising a rotary shaft having a first end and a second end, the first end being supported by a first bearing and the second end being supported by a second bearing so that the rotary shaft can be inclined with respect to the media transport direction with the second bearing which is arranged on a side of the transporting referential surface as a fulcrum when the information medium is transported in the forward direction or reverse direction in the transporting direction in a state that the reference edge of said information medium is distanced from the transporting referential surface; and
- wherein, in a case that the information medium is transported in the media-transporting direction, when the controller detects the reference edge of said information medium is distanced from the transporting referential surface by a predetermined amount or more, said information medium is shifted in the medium-width direction toward the transporting referential surface by the roller for shifting which is rotated in a state that the rotary shaft is inclined with respect to the media transport direction while transporting said information medium without decoding the MICR characters and, when a distance between the reference edge of said information medium and the transporting referential surface is less than the predetermined amount, the MICR characters detected by the magnetic head are decoded.

2. The information media processing device of claim 1 wherein said transport passage has a first transport passage used for transporting said information medium from an insertion slot and a second transport passage used for transporting said information medium when said information medium is transported in the reverse transporting direction, and a diverging means is provided for diverging said first transport passage from said second transport passage.

3. The information media processing device of claim 1,
wherein a gap is provided between an outer circumferential surface of the first end of the shaft and the first bearing which is arranged on an opposite side to the transporting referential surface so that the rotary shaft can be inclined through the gap with respect to the media transport direction with the second bearing as a fulcrum when the information medium is transported in the forward direction or reverse direction in the transporting direction.

4. The information media processing device of claim 2, wherein
said shifting mechanism includes a roller having a rotary shaft which is rotatably supported by two bearings so that the rotary shaft can be inclined with respect to the media transport direction with one of the bearings arranged on a side of the transporting referential surface as a fulcrum, and
when the controller detects the reference edge of said information medium is distanced from the transporting referential surface by the predetermined amount or more, the information medium is transported back and forth through the second transport passage and the information medium is shifted toward the transporting referential surface while being transported through the second transport passage.

* * * * *